(12) United States Patent
Umemoto et al.

(10) Patent No.: US 6,373,361 B1
(45) Date of Patent: Apr. 16, 2002

(54) CORE OF SOLENOID ACTUATOR

(75) Inventors: Atsushi Umemoto; Kouichi Ikoma; Minoru Nakamura, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,300

(22) Filed: Oct. 25, 2000

(30) Foreign Application Priority Data

Oct. 27, 1999 (JP) .......................................... 11-306126

(51) Int. Cl.[7] ................................................ H01F 7/08
(52) U.S. Cl. .................... 335/220; 251/129.15; 335/281
(58) Field of Search ................................ 335/219, 252, 335/256–262, 266, 276, 278, 279; 251/129.01–129.26; 123/90.11; 336/110, 198, 219, 220, 221

(56) References Cited

U.S. PATENT DOCUMENTS 5,799,630 A * 9/1998 Moriya et al. ........... 123/90.11
6,157,277 A * 12/2000 Bulgatz et al. ............. 335/220

* cited by examiner

Primary Examiner—Lincoln Donovan
(74) Attorney, Agent, or Firm—Arent Fox Kintner Plotkin & Kahn, PLLC (57) ABSTRACT

A core of a solenoid actuator is provided which is improved in durability and at the same time ensures high energy efficiency of the solenoid actuator. The core of the solenoid actuator attracts an armature during operation of the solenoid actuator. A plurality of core plates are formed of a magnetically soft material and laminated in a predetermined direction orthogonal to a direction of attracting the armature to form a laminated stack. The core plates form magnetic circuits between the armature and the core plates themselves during the operation of the solenoid actuator. Two core holders formed of a non-magnetic material sandwiches the laminated stack of the plurality of core plates from opposite sides along the predetermined direction. The plurality of core plates are each coated with insulating film, which insulate adjacent two core plates from each other. Further, a rod formed of a non-magnetic material rigidly secures the plurality of core plates and the two core holders to each other to form a unitary assembly.

4 Claims, 10 Drawing Sheets

CORE OF SOLENOID ACTUATOR

BACKGROUND OF THE INVENTION

1. Field of the Invention

This invention relates to a core of a solenoid actuator for electromagnetically driving a driven member, and more particularly to a multilayer core formed by a laminated stack of a plurality of magnetic plates.

2. Description of the Prior Art

Conventionally, a solenoid actuator of this kind has been proposed e.g. by Japanese Laid-Open Patent Publication (Kokai) No. 11-273945, which is applied to a valve-actuating mechanism for opening/closing a valve (gas exchange valve) of an internal combustion engine, and includes an armature and upper and lower electromagnets for vertically attracting the armature.

Each of the electromagnets includes a core having an E shape in cross section. The recessed portions of the E-shaped core serve as a coil groove opposed to the armature and accommodating a coil. The core is a unitary assembly formed of a center core member and a multiplicity of laminates stacked on opposite sides of the center core member. The center core member is formed of silicon steel which is larger in thickness than each laminate and has an E shape in side view. The laminates are each formed of a composite magnetically soft material having the same shape and size as those of the side face of the center core member and are stacked on the opposite sides of the center core member as described above. The center core member and the multiplicity of laminates are welded together to form the unitary component, and the end faces of the center core member and the laminates opposed to the armature form a flat attracting surface for receiving the magnetically attracted armature thereat. The reason why the core (laminated core) having the multilayer construction described above is employed is that it is possible to reduce core loss during energization of the electromagnet compared with the case of a solid core is used, thereby ensuring high energy efficiency.

The armature is connected to the valve via a shaft, and during operation of the solenoid actuator, the armature is attracted alternately by the upper and lower electromagnets to reciprocate vertically to open and close the valve. The armature attracted by the upper and lower electromagnets during the operation of the solenoid actuator is brought into abutment with the attracting surfaces of the cores of the electromagnets.

Therefore, the above conventional cores of the solenoid actuator suffer from the problem that impact of the abutment of the armature on each core during operation of the solenoid actuator can cause weld crack, thereby causing deformation and breakage of the laminates, which results in malfunction of the solenoid actuator. Further, laminates at opposite ends of the core, which are formed of the magnetically soft material, generate magnetic fields between magnetically soft components around the core and themselves during energization of the electromagnet, whereby part of energy of the electromagnet is lost.

SUMMARY OF THE INVENTION

It is an object of the invention to provide a core of a solenoid actuator, which is improved in durability, and at the same time ensures high energy efficiency of the solenoid actuator.

To attain the above object, the present invention provides a core of a solenoid actuator, for attracting an armature during operation of the solenoid actuator, comprising:

- a plurality of core plates made of a magnetically soft material and stacked in a predetermined direction orthogonal to a direction of attracting the armature to form a laminated stack, for forming magnetic circuits between the armature and the core plates themselves during the operation of the solenoid actuator;
- two core holders formed of a non-magnetic material and sandwiching the laminated stack of the plurality of core plates from opposite sides along the predetermined direction;
- an insulator interposed between each adjacent two of the plurality of core plates, for insulating the each adjacent two core plates from each other; and
- fixing means rigidly securing the plurality of core plates and the two core holders to each other to form a unitary assembly.

According to this core (including a yoke forming a magnetic circuit between the armature and the yoke itself) of a solenoid actuator, a stack of the plurality of core plates sandwiched between the two core holders is fixed by the fixing means to form a laminated stack. The plurality of core plates are stacked in the predetermined direction orthogonal to the direction of attracting the armature, in a state insulated from each other by the insulators, a magnetic circuit is formed between each core plate and the armature during the operation of the solenoid actuator, and at this time, an eddy current is generated in each core plate. However, since the core of the invention is formed by the plurality of core plates each of which is thinner than an ordinary solid core, the eddy current generated in each core plate disappears more promptly than in the solid core. Moreover, since the two core holders at the opposite ends of the core are formed of the non-magnetic material, magnetic fields are not readily generated between the core and magnetically soft components around the core during operation of the solenoid actuator, which contributes to reduction of energy loss. Thus, the core of the invention makes it possible to ensure high energy efficiency of the solenoid actuator. Further, the plurality of core plates are only required to be simply stacked in the predetermined direction and fixed in a state sandwiched between the two core holders by the fixing means to form the laminated stack. This makes it possible to make the construction of the core simpler than that of the conventional laminated core, which contributes to reduction of manufacturing costs.

Preferably, the two core holders have end faces with which the armature attracted by the plurality of core plates is brought into abutment during the operation of the solenoid actuator, and wherein the end faces of the two core holders are positioned such that the end faces of the two core holders are flush with armature-side end faces of the laminated stack of the plurality of core plates, or closer to the armature than the armature-side end faces of the laminated stack are.

According to this preferred embodiment, during the operation of the solenoid actuator, the armature attracted by the plurality of core plates is brought into abutment with the plurality of core plates and the two core holders at the same time, or into abutment with the two core holders alone without being brought into contact with the plurality of core plates. Therefore, part or most of the impact caused by the abutment of the armature on the core can be received by the core holders. Particularly when the armature is brought into abutment with the two core holders alone without being brought into contact with the plurality of core plates, most of the impact can be received by the core holders. This makes it possible to prevent breakage of core plates even when they are thin, thereby enhancing the durability of the core plates.

DETAILED DESCRIPTION

The invention will now be described in detail with reference to the drawings showing an embodiment thereof. In the embodiment, a solenoid actuator having cores according to the invention is applied to a valve-actuating mechanism of a vehicle engine, not shown, having four valves per cylinder.

Figure 1:
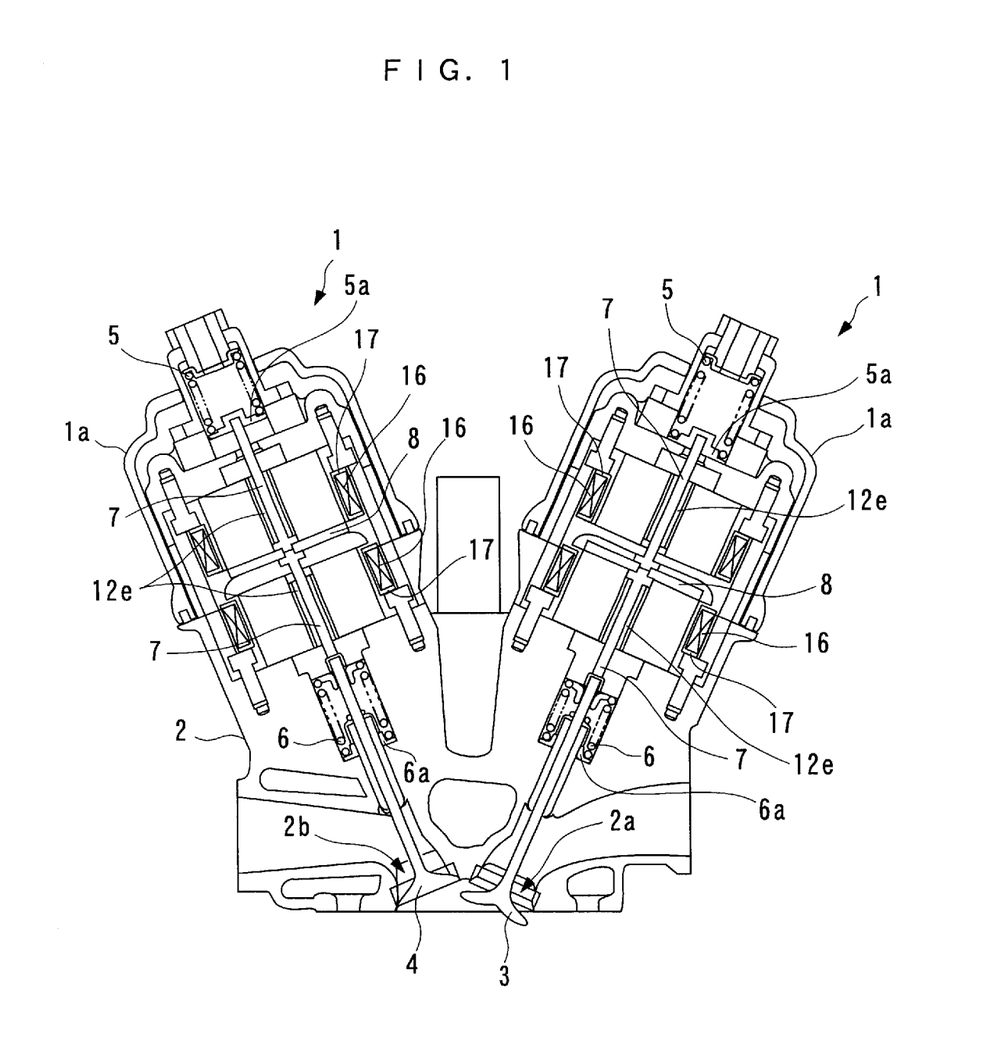
FIG. 1 is a sectional view of a valve-actuating mechanism of a vehicle engine to which is applied a solenoid actuator having cores according to an embodiment of the present invention.

Referring first to FIG. 1, the valve-actuating mechanism is comprised of a pair of solenoid actuators 1, 1 mounted in a cylinder head 2 of the vehicle engine. During operation of the engine, the solenoid actuator 1 arranged on the right-hand side as viewed in the figure drives two intake valves 3, 3 (only one of them is shown in the figure), thereby opening and closing two intake ports 2a, 2a (only one of them is shown in the figure) of the engine, while the solenoid actuator 1 arranged on the left-hand side as viewed in the figure drives two exhaust valves 4, 4 (only one of them is shown in the figure), thereby opening and closing two exhaust ports 2b, 2b (only one of them is shown in the figure) of the same.

These two solenoid actuators 1, 1 are identical in construction to each other, so that the following description will be made by taking the right-hand solenoid actuator 1 for driving the intake valves 3 as an example. Further, for convenience of description, sides indicated by B and B' of a two-headed arrow B-B' in FIG. 2 are referred to as the "front" side and the "rear" side, respectively, while sides indicated by C and C' of a two-headed arrow C–C' are referred to as the "left" side and the "right" side, respectively.

Figure 2:
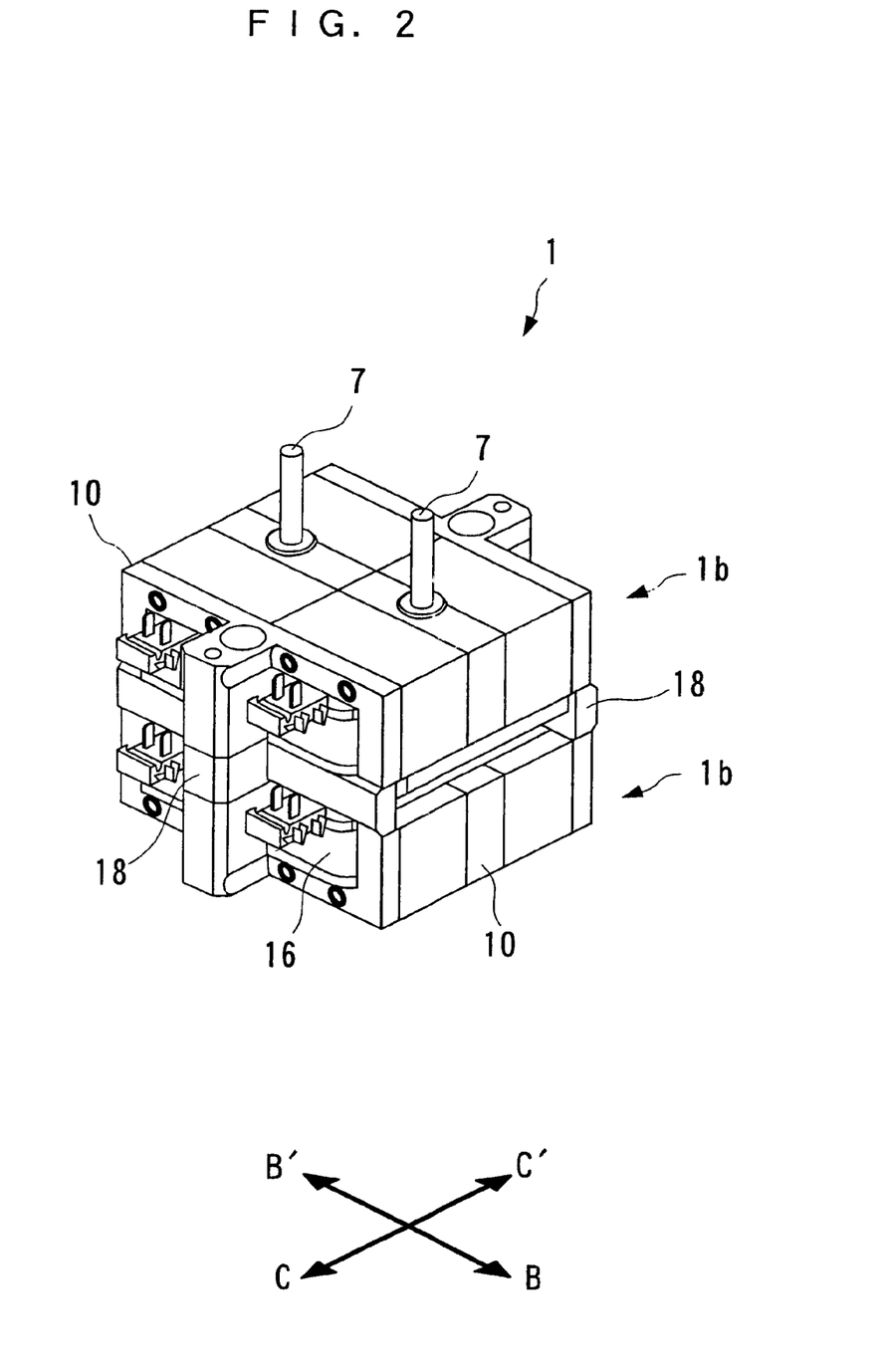
FIG. 2 is a perspective view of the solenoid actuator appearing in FIG. 1.
Figure 3:
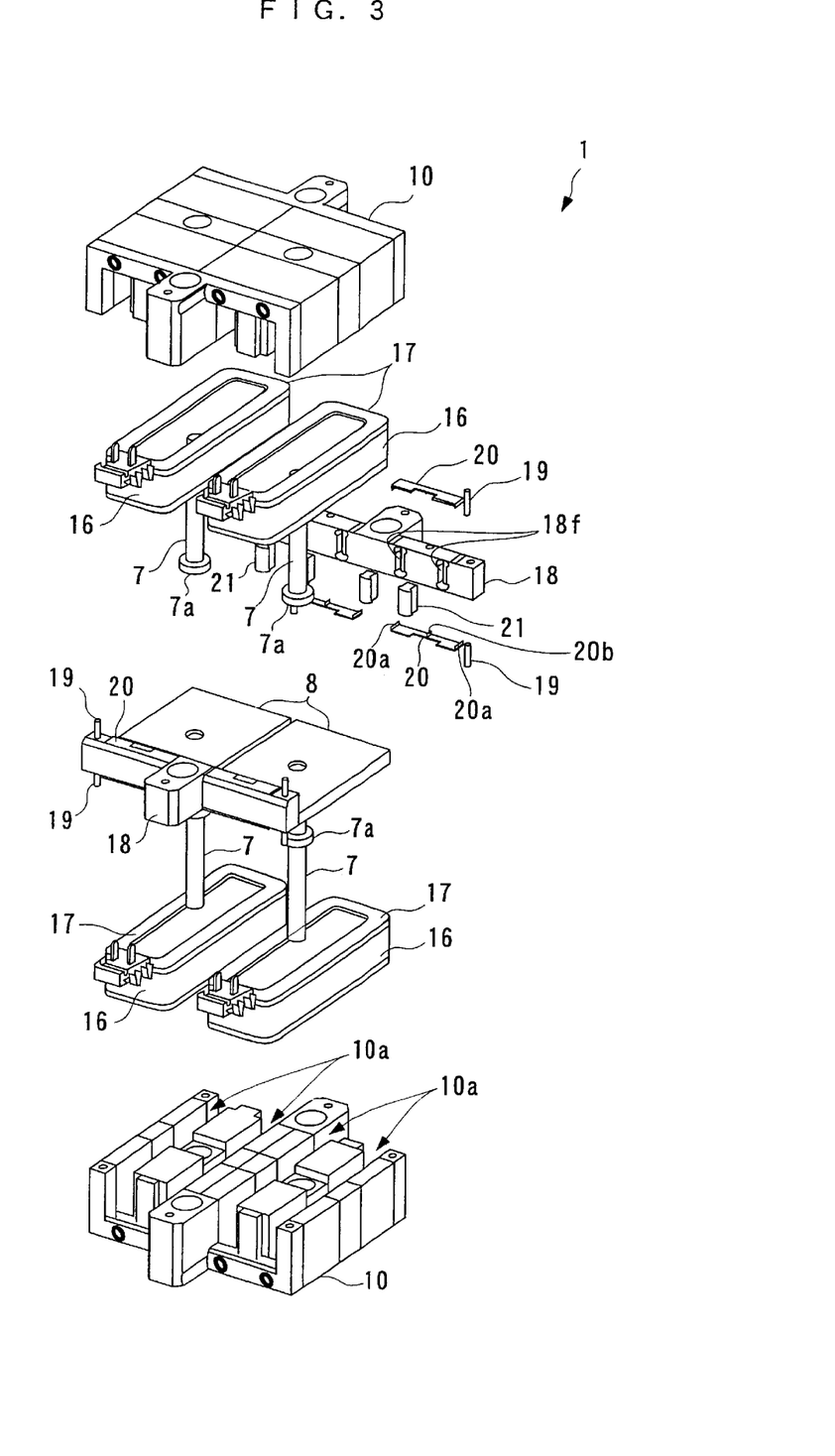
FIG. 3 is an exploded perspective view of FIG. 2 solenoid actuator.

As shown in FIGS. 1 to 3, the solenoid actuator 1 has its front and rear halves constructed symmetrically to each other in the front-rear direction, and the two intake valves 3, 3 are driven by the respective front and rear halves of the solenoid actuator 1. More specifically, the solenoid actuator 1 includes a casing 1a (see FIG. 1) mounted in the cylinder head 2, upper and lower electromagnets 1b, 1b arranged within the casing 1a with a predetermined distance therebetween, two armatures 8, 8 arranged within a space between the upper and lower electromagnets 1b, 1b in a vertically slidable manner, two upper coil springs 5, 5 (only one of them is shown in FIG. 1) for constantly urging the respective armatures 8, 8 downward, and two lower coil springs 6, 6 (only one of them is shown in the figure) for constantly urging the respective armatures 8, 8 upward.

Figure 7A:
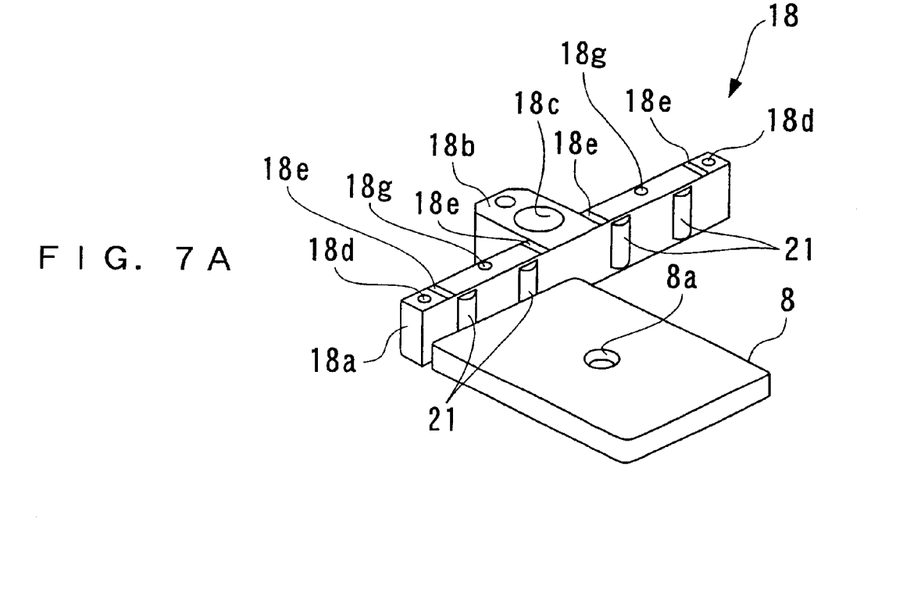
FIG. 7A is a perspective view of a joint and an armature of the FIG. 2 solenoid actuator.
Figure 7B:
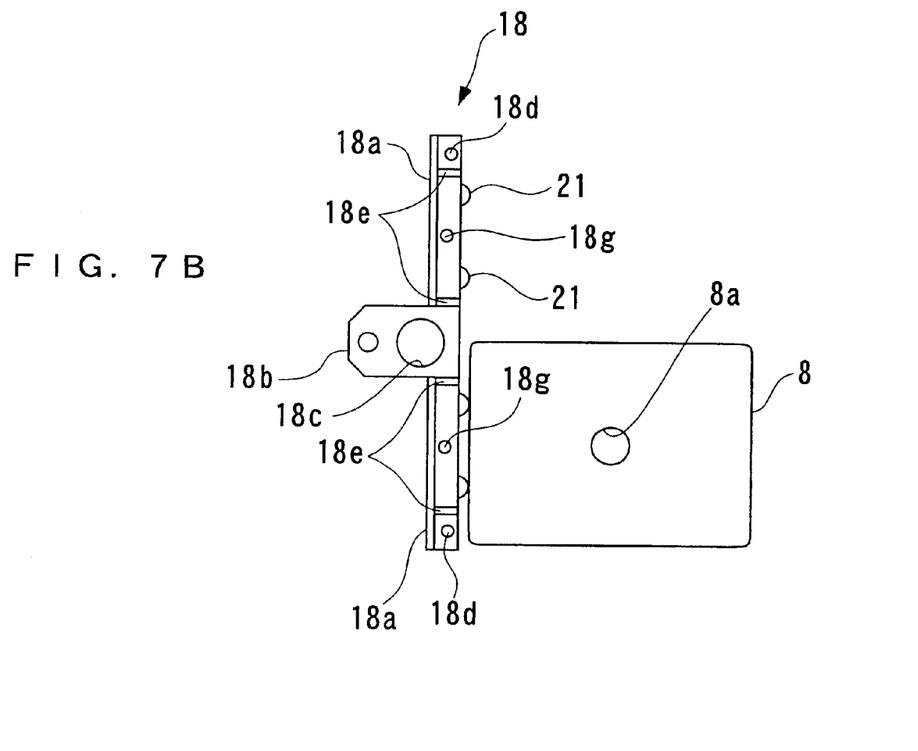
FIG. 7B is a plan view of the joint and the armature of FIG. 7A.

The armatures 8 are rectangular plates each formed of a magnetically soft material (e.g. steel) and having a round through hole 8a formed vertically through a center thereof as shown in FIGS. 7A and 7B. Each of the armatures 8 has left and right end faces thereof held in contact with armature guides 21 of joints 18, referred to hereinafter. The armature 8 moves vertically in a manner guided by the armature guides 21. Further, connected to the armature 8 are upper and lower shafts 7, 7 which are round in cross section and formed of a non-magnetic austenitic stainless steel. The upper end of the lower shaft 7 and the lower end of the upper shaft 7 are fitted in the round through hole 8a of the armature 8. The armature 8 is supported in a sandwiched manner by flanges 7a, 7a formed on the upper and lower shafts 7, 7 at locations close to the lower and upper ends of the respective upper and lower shafts 7, 7.

The lower shaft 7 extends vertically through a guide 12e of a central core holder 12, referred to hereinafter, of the lower electromagnet 1b, and the lower end of the lower shaft 7 is connected to the upper end of the intake valve 3. Similarly, the upper shaft 7 extends vertically through a guide 12e of a central core holder 12 of the upper electromagnet 1b. The upper shaft 7 is held in contact with the upper coil spring 5 via a spring-seating member 5a mounted on the upper end of the upper shaft 7. The shafts 7 are guided through the guides 12e, respectively, whenever the armature 8 moves vertically. The intake valve 3 is held in contact with the lower coil spring 6 via a spring-seating member 6a mounted on the upper end of the intake valve 3.

As shown in FIGS. 2 and 3, the upper and lower electromagnets 1b, 1b are connected to each other via the joints 18 referred to hereinafter. The electromagnets 1b, 1b are identical in construction and arranged in a vertically symmetrical manner with the joints 18 interposed therebetween. In the following, description is made by taking the lower electromagnet 1b as an example.

Figure 4A:
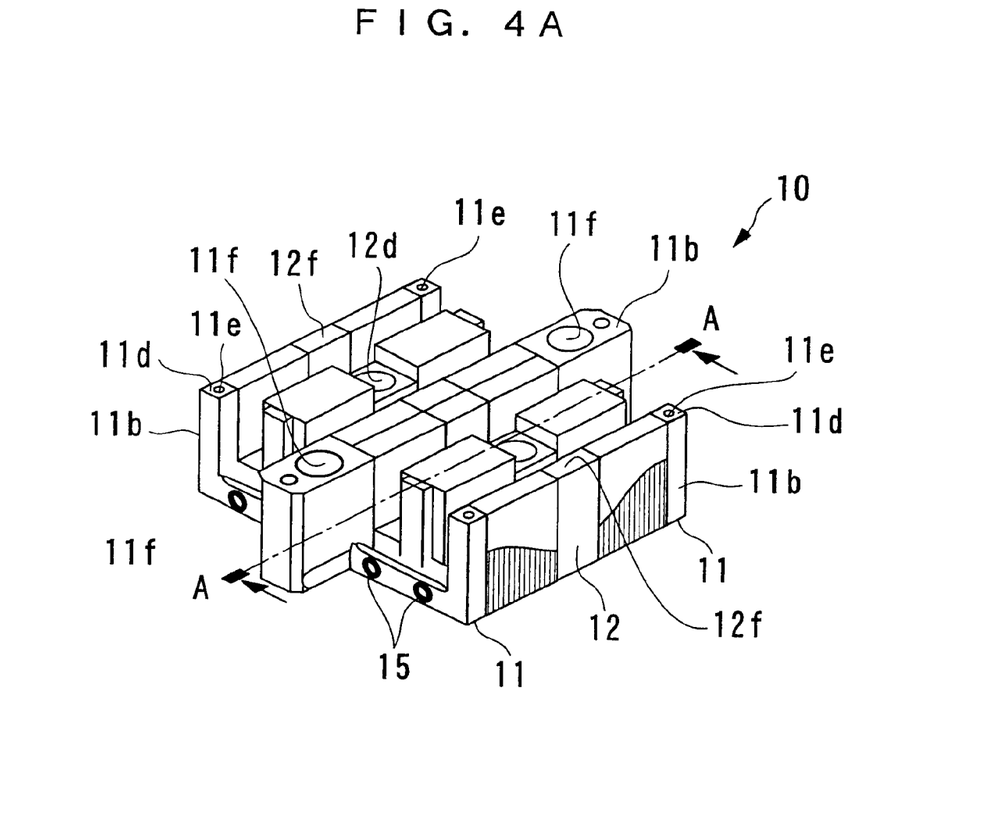
FIG. 4A is a perspective view of a core of the solenoid actuator appearing in FIG. 3.
Figure 4B:
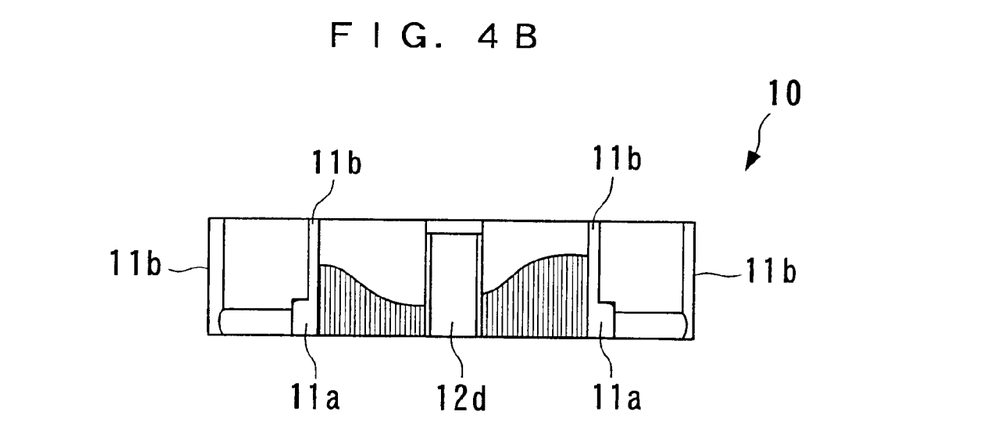
FIG. 4B is a sectional view taken on line A—A of FIG. 4A.
Figure 5:
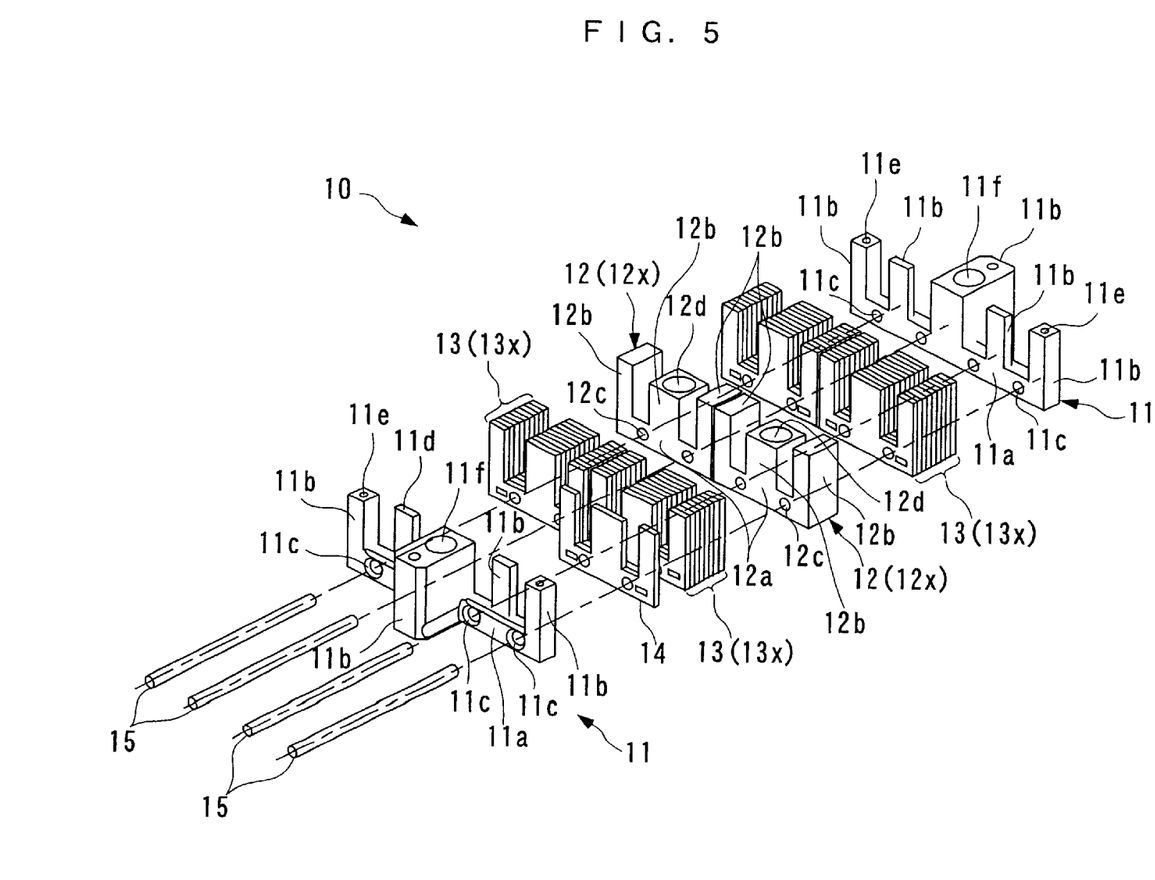
FIG. 5 is an exploded perspective view of the core shown in FIGS. 4A and 4B.

The lower electromagnet 1b includes a core 10 and two coils 16, 16 accommodated in respective coil grooves 10a, 10a formed in the core 10 (see FIG. 3). As shown in FIGS. 4A, 4B and 5, the core 10 is a unitary assembly formed by combining three core holders, i.e. left and right core holders 11, 11 and a central core holder 12, and left and right laminated stacks 13, 13 of core plates 14 by four rods (fixing means) 15.

The left and right core holders 11, 11 are each formed of the austenitic stainless steel similarly to the shafts 7. The two core holders 11, 11 are identical in construction and arranged in a manner symmetrically opposed to each other in the left-right direction. The following description is made by taking the left core holder 11 as an example. The left core holder 11 is a unitary comb-shaped member comprised of a base portion 11a extending in the front-rear direction and five retainer portions 11b each formed to have a shape of a hair comb tooth and extending upward from the base portion 11a to a predetermined height in a manner spaced from each other in the front-rear direction.

Each of the five retainer portions 11b is rectangular in cross section and has a right side face thereof flush with the right side face of the base portion 11a. On the other hand, the left side face of the middle retainer portion 11b protrudes outward or leftward with respect to the left side face of the base portion 11a, the left side faces of the respective front and rear retainer portions 11b, 11b are flush with that of the base portion 11a, and those of the inner retainer portions 11b, 11b formed between the middle retainer portion 11b and the respective front and rear retainer portions 11b, 11b are slightly recessed inward or rightward from the base portion 11a. It should be noted that the middle retainer portion 11b is formed by integrating a portion protruding outward or leftward from the base portion 11a.

Formed in respective predetermined portions of the base portion 11a are four through holes 11c each extending in the left-right direction and having a left-side opening chamfered. Further, the front and rear retainer portions 11b each have an upper face thereof formed with a round hole 11e open upward, and the middle retainer portion 11b is formed with a through hole 11f extending vertically.

The central core holder 12 is also formed of the same austenitic stainless steel as that of the core holder 11. The central core holder 12 extends in the front-rear direction and has the same length along this direction as that of the core holder 11. Further, the central core holder 12 has a comb-like shape in side view, which is substantially the same as the shape of the core holder 11. The central core holder 11 is formed by joining two holder members 12X, 12X to each other in the front-rear direction and has opposite flat side faces. Each of the holder members 12X has an E shape in cross section and has a base portion 12a extending in the front-rear direction, and three retainer portions 12b, 12b, 12b integrally formed with the base portion 12e and extending upward, respectively, from the front and rear ends and a central portion of the base portion 12a. The base portion 12a is formed therethrough with two through holes 12c, 12c extending in the left-right direction. The front and rear retainer portions 12b, 12b are identical in height to the retainer portions 11b of the core holder 11, and the middle retainer portion 12b is lower than the other retainer portions 12b, 12b. This enables the upper face of the central retainer portion 12b to serve as an indentation for receiving the flange 7a of the shaft 7 when the armature 8 is brought into abutment with the core 10 (see FIG. 1).

Further, the middle retainer portion 12b is formed therethrough with a through hole 12d extending vertically, in which is fitted the hollow cylindrical guide 12e (see FIG. 1) for guiding vertical sliding motion of the shaft 7.

The central core holder 12 is formed by joining the front retainer portion 12b of one of the holder members 12X, 12X constructed as above to the rear retainer portion 12b of the other. The two retainer portions 12b, 12b joined to each other to form the central portion of the central core holder 12 are opposed to the middle retainer portion 11b of the core holder 11. Similarly, the opposite front and rear retainer portions 12b, 12b of the central core holder 12 other than the two retainer portions 12b, 12b forming the central portion are opposed to the front and rear retainer portions 11b, 11b of the core holder 11, respectively, while the middle retainer portions 12b, 12b are opposed to the inner retainer portions 11b, 11b, respectively. Further, the four through holes 12c are identical in diameter to the four through holes 11c formed through the core holder 11, respectively, and each opposed to the corresponding one of the four through holes 11c.

Figure 6A:
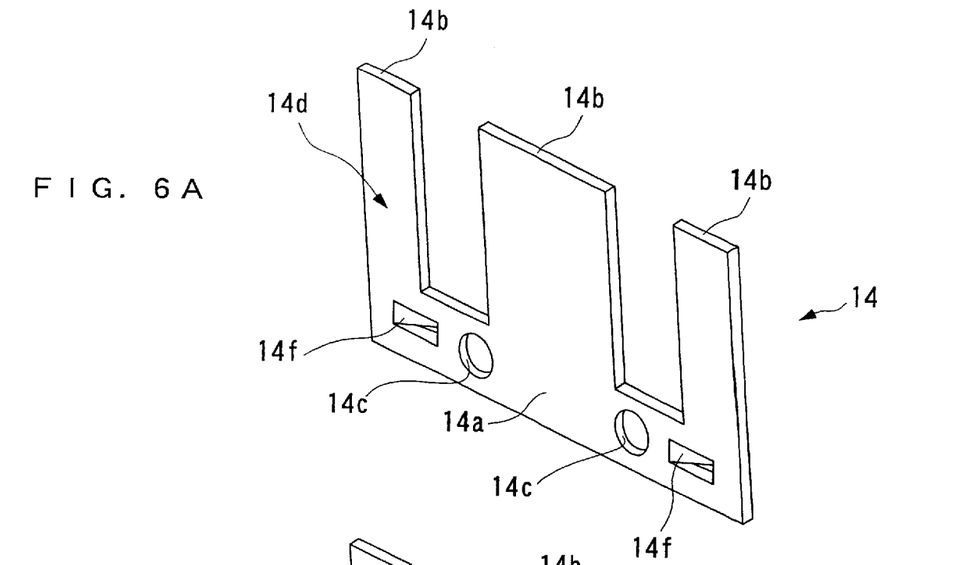
FIG. 6A is a perspective view of a core plate as a component of the core shown in FIGS. 4A and 4B.
Figure 6B:
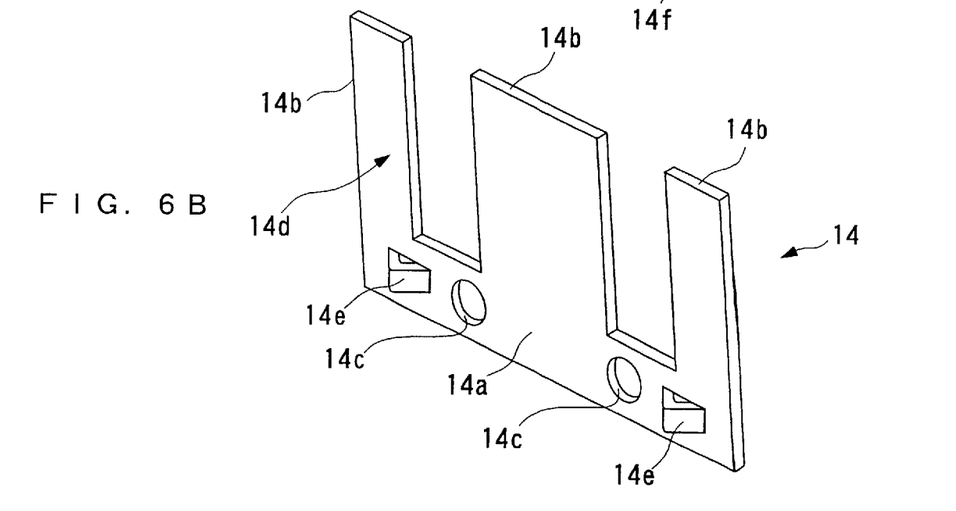
FIG. 6B is a perspective view showing the opposite side of the FIG. 6A core plate.
Figure 6C:
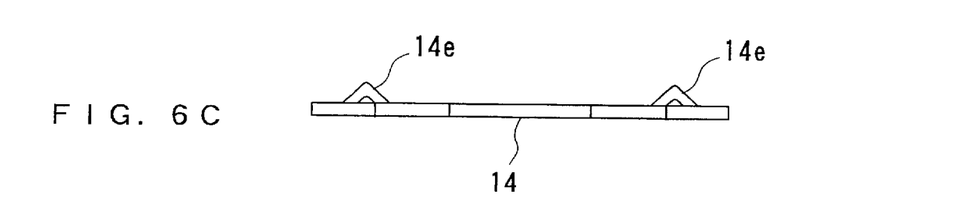
FIG. 6C is a plan view of the core plate.

The laminated stacks 13 are each comprised of a pair of laminated stacks 13X, 13X of core plates 14 arranged in the front-rear direction. Each laminated stack 13X of core plates 14 is formed by laminates of a predetermined number of core plates 14, one of which is shown in FIGS. 6A to 6C, in the left-right direction. Each core plate 14 is formed of a thin non-oriented silicon steel plate and has the whole surface thereof coated with an insulating film (insulating material) 14d e.g. of epoxy resin. Adjacent ones of the core plates 14 are insulated from each other by the insulating films 14d. Further, the core plate 14 is formed to have substantially the same E shape and size as those of the side face of the holder member 12X, by stamping a non-oriented silicon steel plate. More specifically, the core plate 14 is comprised of a base portion 14a extending in the front-rear direction and three magnetic path-forming portions 14b, 14b, 14b extending upward, respectively, from the front and rear ends and central portion of the base portion 14a, the base portion 14a being formed with two through holes 14c, 14c open in the left-right direction.

Figure 10A:
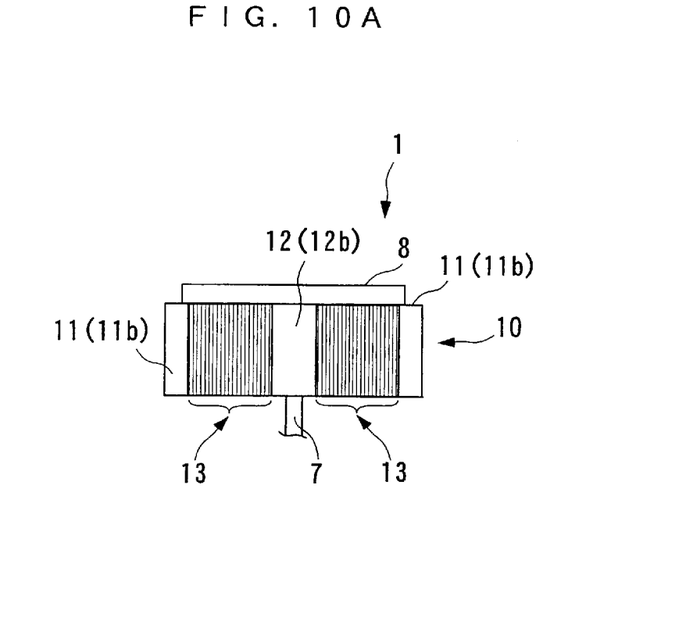
FIG. 10A is a front view showing a state of the armature attracted by an electromagnet during operation of the solenoid actuator, in which it is in abutment with the core.
Figure 10B:
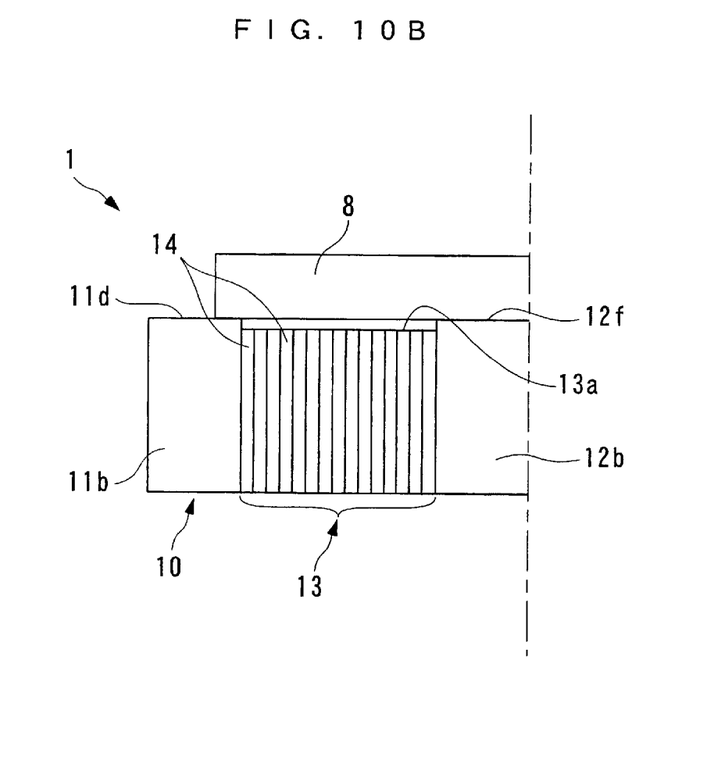
FIG. 10B is an enlarged view showing an essential portion of FIG. 10A.

The three magnetic path-forming portions 14b are identical in height to each other, and lower than the front and rear retainer portions 12b of the central core holder 12 by a predetermined height (e.g. equal to or smaller than 20 μm), so that an upper face 13a (end face) of the laminated stack 13X is lower than the upper face 11d of the core holder 11 and an upper face 12f of the central core holder 12 (see FIG. 10). The corresponding through holes 14c of the respective core plates 14 are continuous with each other to form a through hole extending through the laminated stack 13X in the left-right direction. Further, the through holes 14c are each identical in diameter to the corresponding through hole 11c of the core holder 11 and the corresponding through hole 12c of the core holder 12 and positioned in a manner concentric with the corresponding through holes 11c and 12c. Further, the base portion 14a is formed with two projections 14e, 14e at opposite locations slightly laterally outward of the respective through holes 14c, 14c. Each projection 14e having a V shape in plan view is projected rightward from the base portion 14a, and a recess 14f is formed in a reverse side of each projection 14e.

The projections 14e of one core plate 14 are each fitted in the corresponding recess 14f of another core plate 14 adjacent thereto in the rightward direction, whereby the core plates 14 are all held in a closely stacked state. Further, the core plate 14 positioned at the right end of the laminated stack 13X is formed not with the projections 14e and recesses 14f, but only with horizontally elongated rectangular holes, not shown, in which are fitted the respective corresponding projections 14e of the left-hand adjacent core plate 14. Therefore, the right end face of the laminated stack 13X is flat, so that it is in intimate contact with the central core holder 12 or the right core holder 11.

Each of the rods 15 is a round bar which is slightly smaller in diameter than the through holes 11c, 12c, 14c. The rods 15 are each fitted through the corresponding through holes 11c, 12c, 14c and extend in the left-right direction. The right and left end portions of each rod 15 projecting from the through holes 11c, 11c, respectively, are swaged on the outer end faces of the respective base portions 11a of the right and left core holders 11. Thus, the left-hand laminated stack 13 is sandwiched between the left core holder 11 and the central core holder 12, while the right-hand laminated stack 13 is sandwiched between the central core holder 12 and the right core holder 11, whereby these members are rigidly secured to each other to form the core 10.

The coils 16, 16 are each formed to have a horizontally elongated annular or toroidal shape and assembled with bobbins 17, 17 into a unitary assembly. Each bobbin 17 is formed of a synthetic resin and has a wall U-shaped in cross section for receiving a corresponding one of the coils 16, 16 therein. The bobbins 17, 17 are accommodated in the two coil grooves 10a, 10a, respectively. Each coil groove 10a is defined by the retainer portions 11b of the core holders 11, the retainer portions 12b of the central core holder 12, and the magnetic path-forming portions 14b of the core plates 14. Each of the coils 16, 16 is accommodated within the annular coil groove 10a in a manner enclosing the members positioned inside the annular coil groove 10a, i.e. the inner retainer portions 11b of the opposite core holders 11, the middle retainer portion 12b of the central core holder 12, and the middle magnetic path-forming portions 14b.

Figure 8A:
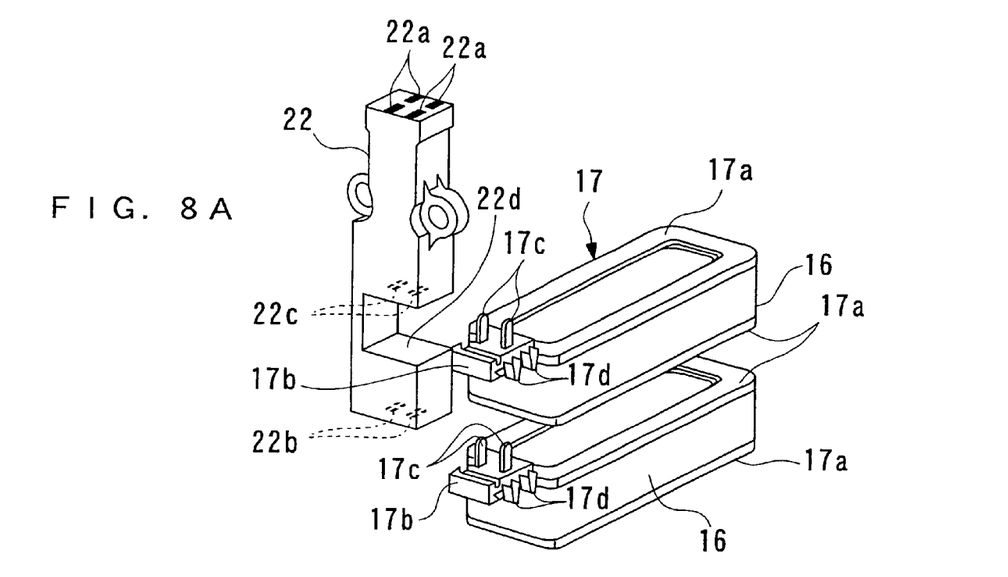
FIG. 8A is a perspective view of bobbins each bearing its associated components and a connector of the FIG. 2 solenoid actuator before they are assembled.
Figure 8B:
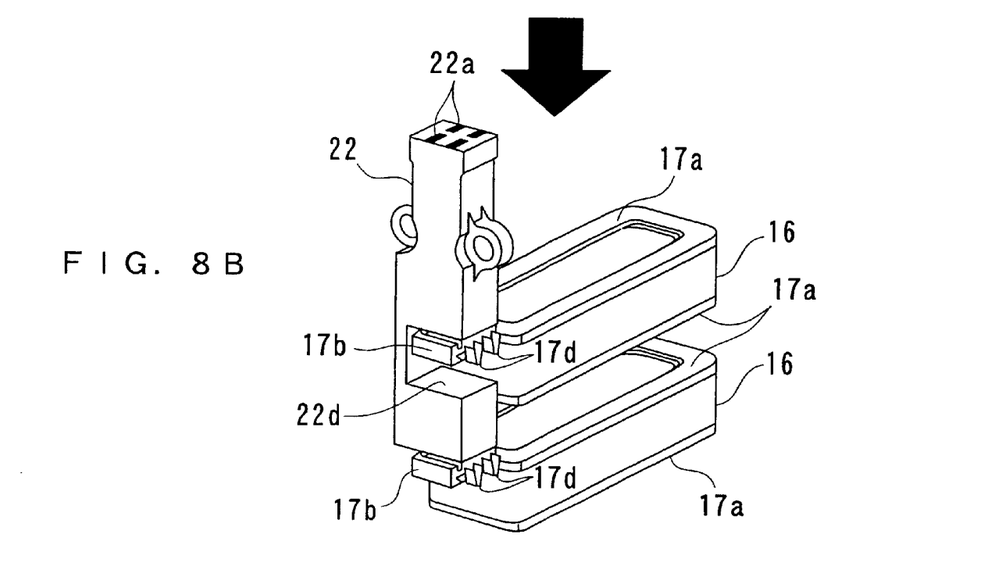
FIG. 8B is a perspective view of the bobbins each bearing its associated components and the connector of the FIG. 2 solenoid actuator after they are assembled.

As shown in FIGS. 8A and 8B, the bobbin 17 is comprised of upper and lower brims 17a, 17a, a terminal portion 17b projecting leftward from the left end of the upper brim 17a, a pair of front and rear terminals 17c, 17c projecting upward from the terminal portion 17b, and a pair of V-shaped metal connectors 17d, 17d connected to the terminals 17c, 17c. The front and rear terminals 17c, 17c are each formed of an electrically conductive metal plate and arranged such that principal planes thereof are positioned in a manner parallel and opposed to each other in the front-rear direction. The coil 16 is wound around the bobbin 17 between the upper and lower brims 17a, 17a, and the ends of the coil 16 are connected to the metal connectors 17d, 17d, respectively, to be electrically connected to the respective two terminals 17c, 17c.

The lower electromagnet 1b is constructed as above, and the upper electromagnet 1b is identical in construction to the lower electromagnet 1b. Further, as shown in FIGS. 2, 3 and 7A, 7B, the upper and lower electromagnets 1b, 1b are joined to each other by a pair of left and right joints 18, 18. The two joints 18, 18 are arranged in a manner symmetrically opposed to each other in the left-right direction. Each of the joints 18 is formed of an austenitic stainless steel and extends in the front-rear direction such that it has the same length as that of the core holder 11. The joint 18 has substantially the same shape in plan view as that of the core holder 11. More specifically, the joint 18 is comprised of a base portion 18a extending in the front-rear direction and a protrusion 18b integrally formed with the base portion 18a and protruding outward from the central portion of the same.

The protrusion 18b is formed with a vertical through hole 18c which is identical in diameter to the through hole 11f of the middle retainer portion 11b of the core holder 11 and positioned in a manner concentric with the same.

The base portion 18a is identical in height to the protrusion 18b and has round holes 18d, 18d formed, respectively, in the opposite end portions of the upper face thereof as well as round holes 18d, 18d formed, respectively, in the opposite end portions of the lower face thereof. Each round hole 18d is identical in diameter and concentric with the corresponding round hole 11e of the core holder 11. Fitted in each of the round holes 18d is half of a pin 19 in the form of a round rod formed of an austenitic stainless steel, and the other half of the pin 19 is fitted in the round hole 11e, whereby the upper and lower cores 10, 10 are coupled to each other via the joints 18, 18.

Further, arranged on the upper face of the base portion 18a are front and rear coil-protecting buffer plates 20, 20 (see FIG. 3). The coil-protecting buffer plates 20, 20 are identical in shape to each other and arranged in a symmetrical manner in the front-rear direction, so that the following description will be made by taking the front coil-protecting buffer plate 20 as an example. The front coil-protecting buffer plate 20 is formed of a synthetic resin and smaller in width in the left-right direction than the base portion 18a. Further, the buffer plate 20 is formed with opposite end projections 20a and a central projection 20b projecting vertically (downward in this example) from the underside thereof. The base portion 18a has two groves 18e and a hole 18g formed at respective predetermined locations on the front-side portion of the upper face thereof, and the two opposite end projections 20a are fitted in the two grooves 18e, and the central projection 20b is fitted in the hole 18g, respectively, whereby the front coil-protecting buffer plate 20 is mounted on the base portion 18a. The rear coil-protecting buffer plate 20 is mounted on the base portion 18a in the same manner. Further, on the lower face of the base portion 18a, there are also mounted front and rear coilprotecting buffer plates 20, 20 in a similar manner.

Further, the four armature guides 21 are fixed to the inner surface of the joint 18 at predetermined space intervals, for guiding vertical movement of the armatures 8 (see FIGS. 7A, 7B). Each armature guide 21 is formed of the austenitic stainless steel and has a fitting portion which is rectangular in cross section and a guide portion integrally formed with the fitting portion and semicircular in cross section. The inner side surface of the joint 18 has four vertical grooves 18f formed at predetermined space intervals. The fitting portion 21a of each armature guides 21 is fitted in the corresponding vertical groove 18f whereby the armature guide 21 is fixed to the joint 18. In this state, each of the guide portions semicircular in cross section protrudes toward the armature 8 from the inner side surface of the joint 18 and at the same time held in contact with the left or right end face of the armature 8. Thus, the armatures 8 are each guided by the corresponding armature guides 21 when they are moved.

In a state where the upper and lower electromagnets 1b, 1b are joined to each other via the joint 18 constructed as above, each of the four coils 16 (bobbins 17) is vertically sandwiched by the corresponding core 10 and joints 18, as shown in FIG. 2, in a state of the brim 17a of the bobbin 17 in abutment with the corresponding coil-protecting buffer plate 20. The through hole 11f of each core 10 and the through hole 18c of each joint 18 extend vertically in a manner continuous with each other. A bolt, not shown, is screwed into the cylinder head 2 through these holes 11f, 18c, whereby the electromagnets 1b, 1b are rigidly fixed to the cylinder head 2.

Further, as shown in FIGS. 8A, 8B, the front (or rear) coil 16 and bobbin 17 of the upper electromagnet 1b and the front (or rear) coil 16 and bobbin 17 of the lower electromagnet 1b are arranged vertically in an identical position in plan view. The two terminals 17c, 17c of each of the two bobbins 17 are connected to a connector 22 which is generally in the form of a rectangular column. The connector 22 is formed of a synthetic resin and extends vertically.

The connector 22 has an upper end face thereof formed with four upper socket openings 22a each in the form of a slit and open upward, and a lower end face thereof formed with two lower socket openings 22b, 22b each identical in shape to the upper socket opening 22a. The two lower socket openings 22b, 22b are parallel and opposed to each other in the front-rear direction and open downward at respective locations corresponding to the terminals 17c, 17c. Further, formed in the lower end portion of the connector 22 is a cut-away portion 22d formed by cutting away a parallelepiped portion of the connector 22 from the front side of the same. The cut-away portion 22d has an upper wall thereof formed with two middle socket openings 22c, 22c. The middle socket openings 22c, 22c are open downward and identical in position in plan view to the respective lower socket openings 22b, 22b. Within each of the socket openings 22a to 22c, there is provided a metal connector, not shown, comprised of two electrically conductive metal strips arranged in a manner each extending vertically and combined such that root portions thereof are held in contact with each other and a space therebetween is increased toward the outer or forward ends thereof. The terminals 17c are each sandwiched by the metal strips of a corresponding one of the metal connectors in the socket openings 22b, 22c.

The metal connectors of the front two of the four upper socket openings 22a are electrically connected to the respective metal connectors of the middle socket openings 22c, 22c, while the metal connectors of the rear two of the four upper socket openings 22a are electrically connected to the respective metal connectors of the lower socket openings 22b, 22b. Further, a cable, not shown, having four terminals extends from a controller, not shown, and the four terminals of the cable are plugged into the four socket openings 22a, respectively, whereby the four coils 16 are electrically connected to the controller.

Next, the operation of the solenoid actuator 1 constructed as above is explained. In the solenoid actuator 1, the front half thereof and the rear half thereof operate similarly, so that description will be made by taking the operation of the front half as an example.

When neither of the upper and lower electromagnets 1b, 1b is energized, the front armature 8 is held in its neutral position between the upper and lower electromagnets 1b, 1b by the upper and lower coil springs 5 and 6. This causes the intake valve 3 to be in a halfway opened/closed position, not shown.

When the lower electromagnet 1b, for instance, is energized in this state by electric power supplied from the controller, the armature 8 is attracted by the lower electromagnet 1b, whereby the armature 8 is moved downward against the urging force of the lower coil spring 6 to a position where it is brought into abutment with the core 10 of the lower electromagnet 1b (see FIGS. 10A, 10B). In accordance with this movement of the armature 8, the upper and lower shafts 7, 7 slide downward in a manner guided by the upper and lower guides 12e, 12e, respectively. This causes the intake valve 3 to open the intake port 2a.

Subsequently, when the energization of the lower electromagnet 1b is stopped, the armature 8 is moved upward by the urging force of the lower coil spring 6. Further, when the upper electromagnet 1b is energized at a predetermined timing, the armature 8 is attracted by the upper electromagnet 1b, whereby the armature 8 is moved upward against the urging force of the upper coil spring 5 to a position where it is brought into abutment with the core 10 of the upper electromagnet 1b (see the left-hand solenoid actuator 1 for driving the exhaust valves 4 in FIG. 1). This upward movement of the armature 8 causes the intake valve 3 to close the intake port 2a. Then, after stoppage of the energization of the upper electromagnet 1b, the lower electromagnet 1b is energized at a predetermined timing to cause the intake valve 3 to open the intake port 2a, similarly to the above. By repeatedly carrying out the above operations, the armature 8 is caused to vertically reciprocate between the upper and lower electromagnets 1b, 1b, thereby opening and closing the intake valve 3.

Figure 9:
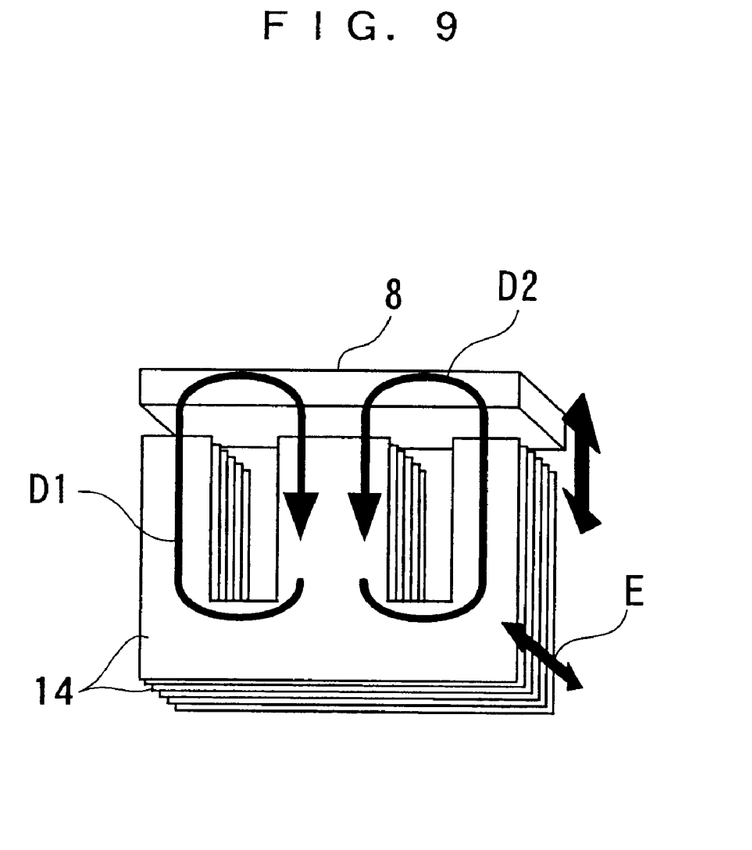
FIG. 9 is a view which is useful in explaining directions of flow of eddy currents in the core plates and directions of magnetic fluxes between the core plates and the armature, during operation of the solenoid actuator.

When the upper or lower electromagnet 1b is energized by electric power supplied to the coil 16 during operation of the solenoid actuator 1, magnetic circuits are formed between the armature 8 and the laminated stacks 13 of the core 10. Each of the core plates 14 forming the laminated stack 13 has the whole surface thereof coated with the insulating film 14d as described above, so that a magnetic circuit is formed between the armature 8 and each core plate 14 as shown in FIG. 9. More specifically, magnetic fluxes flow in respective directions indicated by arrows D in the figure, and at the same time, eddy currents are about to flow in directions indicated by a double-headed arrow E in the figure. However, the eddy currents are inhibited by the insulating films 14d from flowing to respective adjacent core plates 14 and disappear promptly within each thin core plate 14. Thus, it is possible to reduce core loss of the electromagnets 1b including an eddy current loss compared with the case where a core portion corresponding to the laminated stack 13 is formed of solid non-oriented silicon steel. Further, since the two core holders 11, 11 at the opposite ends of the core 10 are each formed of the non-magnetic material, magnetic fields are not readily generated between the core 10 and the magnetically soft components around the core 10 during operation of the solenoid actuator 1, and hence energy loss can be reduced. These features ensure high energy efficiency of the solenoid actuator.

Further, since the upper face 13a of each laminated stack 13 is lower than the upper faces 11d, 12f of the respective core holders 11, 12 by a predetermined height, when the armature 8 is attracted by the core 10 of the electromagnet 1b as shown in FIGS. 10A, 10B, the armature 8 is brought into abutment with the three core holders 11, 12, 11 alone, without being brought into contact with the laminated stacks 13, so that most of impact caused by the abutment of the armature 8 on the core 10 can be received by the core holders 11, 12, 11. Moreover, the core plates 14 are stacked in the state of the projections 14e of one core plate 14 being fitted in the recesses 14f of another core plate 14 adjacent thereto in the rightward direction, and in addition, the four rods 15 extend through the core holders 11, 12, 11 and the laminated stacks 13, which makes it possible to prevent relative vertical displacement of the core plates 14 with respect to each other due to the impact caused by the abutment of the armature 8 on the core 10. Further, since the core holders 11, 12 and the rod 15 are each formed of a highly stiff austenitic stainless steel, they cannot be deformed even if they receive the impact caused by the abutment of the armature 8 on the core 10. As described above, differently from the conventional core, the core 10 of the present embodiment makes it possible to prevent breakage of each core plate 14, thereby enhancing the durability of the core 10 in spite of its multilayer structure formed by stacking the laminates of the thin core plates 14.

Still further, in assembling the laminated stack 13 the projections 14e and recesses 14f of the core plates 14 can be used for positioning the core plates 14 with respect to each other, thereby facilitating assembly work of the laminated stack 13. Moreover, the core 10 is formed by rigidly joining the two laminated stacks 13, 13 each comprised of the predetermined number of core plates 14 stacked in the left-right direction, and the left, central, and right core holders by the rods 15 such that the two laminated stacks 13, 13 are sandwiched between the left and central core holders and between the central and right core holders, respectively, so that the core 10 can have a simpler construction than in the prior art. Additionally, a core plate 14 can be easily produced simply by stamping a flat steel sheet. These features contributes to reduction of manufacturing costs of the core 10.

Although in the above embodiment, the height of the core plate 14, i.e. the height of the laminated stack 13 is set lower than that of the core holders 11, 12 by a predetermined height (e.g. equal to or smaller than 20 μm), the relationship between the laminated stack 13 and the core holders 11, 12 in respect of height is not necessarily limited thereto, but from the viewpoint of prevention of breakage of core plates 14, the height of the laminated stack 13 may be set further lower than that of the core holders 11, 12. From the viewpoint of attractive force and energy efficiency of the core, it is preferable that the height of the laminated stack 13 is closer to that of the core holders 11, 12, and optimum performance will be attained by setting these heights to an identical value, that is, by making the upper end faces of the laminated stack, and those of the core holders 11, 12 flush with each other. Even in this case, part of the impact of the abutment of the armature 8 on the core can be received by the core holders 11, 12, so that even when think core plates 14 are used, it is possible to prevent breakage of them, thereby enhancing the durability thereof.

Further, the core holders 11, 12 and the rods 15 are each formed of the austenitic stainless steel, this is not limitative, but any other suitable non-magnetic material, such as aluminum, may be used. Further, although the core plates 14 are formed of the non-oriented silicon steel plate, this is not limitative, either, but any other suitable magnetically soft material, such as oriented silicon steel plate, may be used. Moreover, the core holders 11, 12, 11 and the laminated stacks 13 are rigidly joined into a unitary assembly by swaging the ends of the respective rods 15 extending through the three core holders and the two laminated stacks, this is not limitative, but bolts and nuts, or the like may be employed to join the core holders 11, 12, 11 and the laminated stacks 13.

Further, although in the above embodiment, description is made of an example in which the armature 8 is attracted alternately by the upper and lower electromagnets 1b, 1b, for reciprocating motion, this is not limitative, but the solenoid actuator may be configured such that it uses one electromagnet and one coil spring, for instance, to cause the armature 8 to reciprocate. Further, although the solenoid actuator 1 is applied to the valve-actuating mechanism of the vehicle engine, this is not limitative, but the solenoid actuator 1 can be applied to various driving units, including one for driving a valve for opening and closing an EGR pipe, one for driving fuel injection valves, and others for driving various kinds of driven members of the engine.

It is further understood by those skilled in the art that the foregoing is a preferred embodiment of the invention, and that various changes and modifications may be made without departing from the spirit and scope thereof.

What is claimed is:

1. A core of a solenoid actuator, for attracting an armature during operation of said solenoid actuator, comprising:

a plurality of core plates made of a magnetically soft material and stacked in a predetermined direction orthogonal to a direction of attracting said armature to form a laminated stack, for forming magnetic circuits between said armature and said core plates themselves during said operation of said solenoid actuator;

two core holders formed of a non-magnetic material and sandwiching said laminated stack of said plurality of core plates therebetween along said predetermined direction;

an insulator interposed between each adjacent two of said plurality of core plates, for insulating said each adjacent two core plates from each other; and fixing means rigidly securing said plurality of core plates and said two core holders to each other to form a unitary assembly.

2. A core of a solenoid actuator, according to claim 1, wherein said two core holders have end faces with which said armature attracted by said plurality of core plates is brought into abutment during said operation of said solenoid actuator.

3. A core of a solenoid actuator, according to claim 2, wherein said end faces of said two core holders are positioned such that said end faces of said two core holders are flush with armature-side end faces of said laminated stack of said plurality of core plates.

4. A core of a solenoid actuator, according to claim 2, wherein said end faces of said two core holders are positioned such that said end faces of said two core holders are closer to said armature than said armature-side end faces of said laminated stack are.

* * * * *